M. F. ROSS.
MOTOR VEHICLE CONSTRUCTION.
APPLICATION FILED NOV. 17, 1916.
1,253,729.
Patented Jan. 15, 1918.
2 SHEETS—SHEET 2.
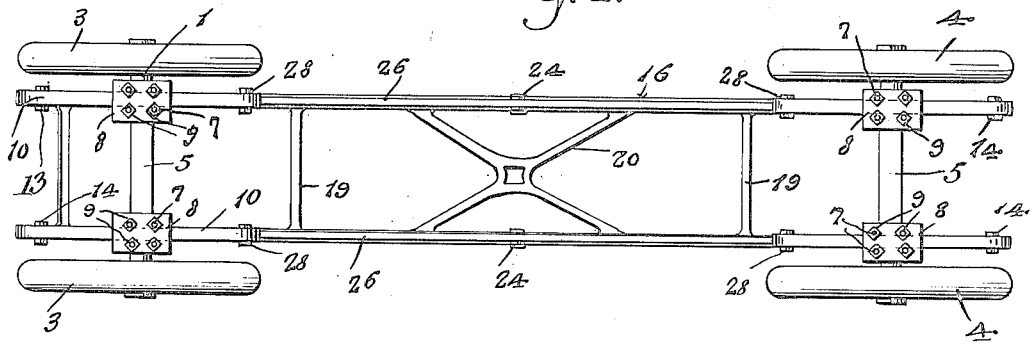
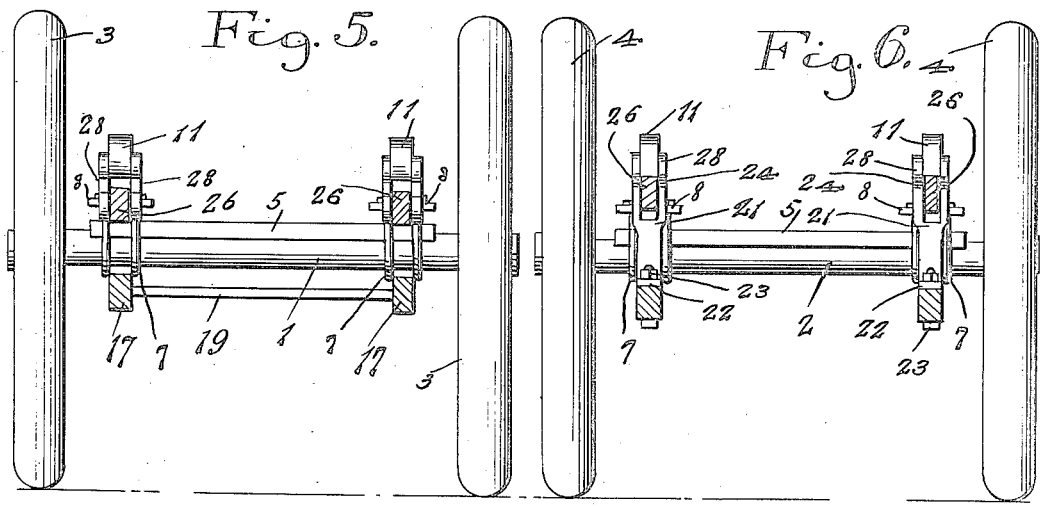
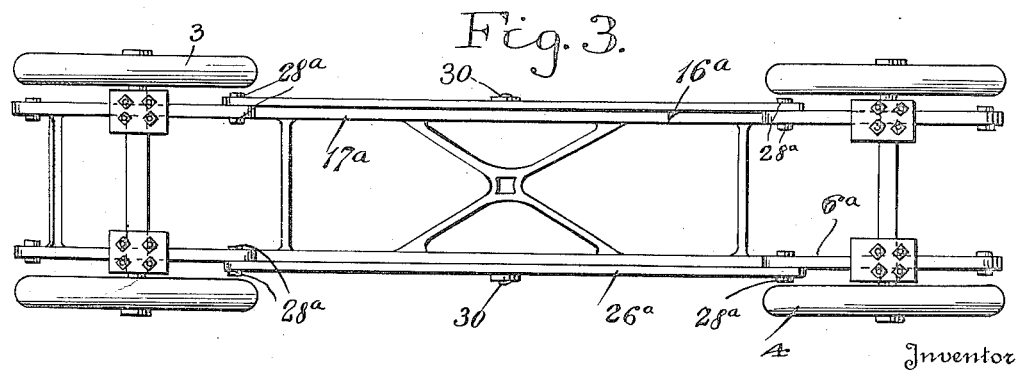
Witness:
H. Walker.
H. Kaye Martin
Inventor
M. F. Ross.
By
Attorney

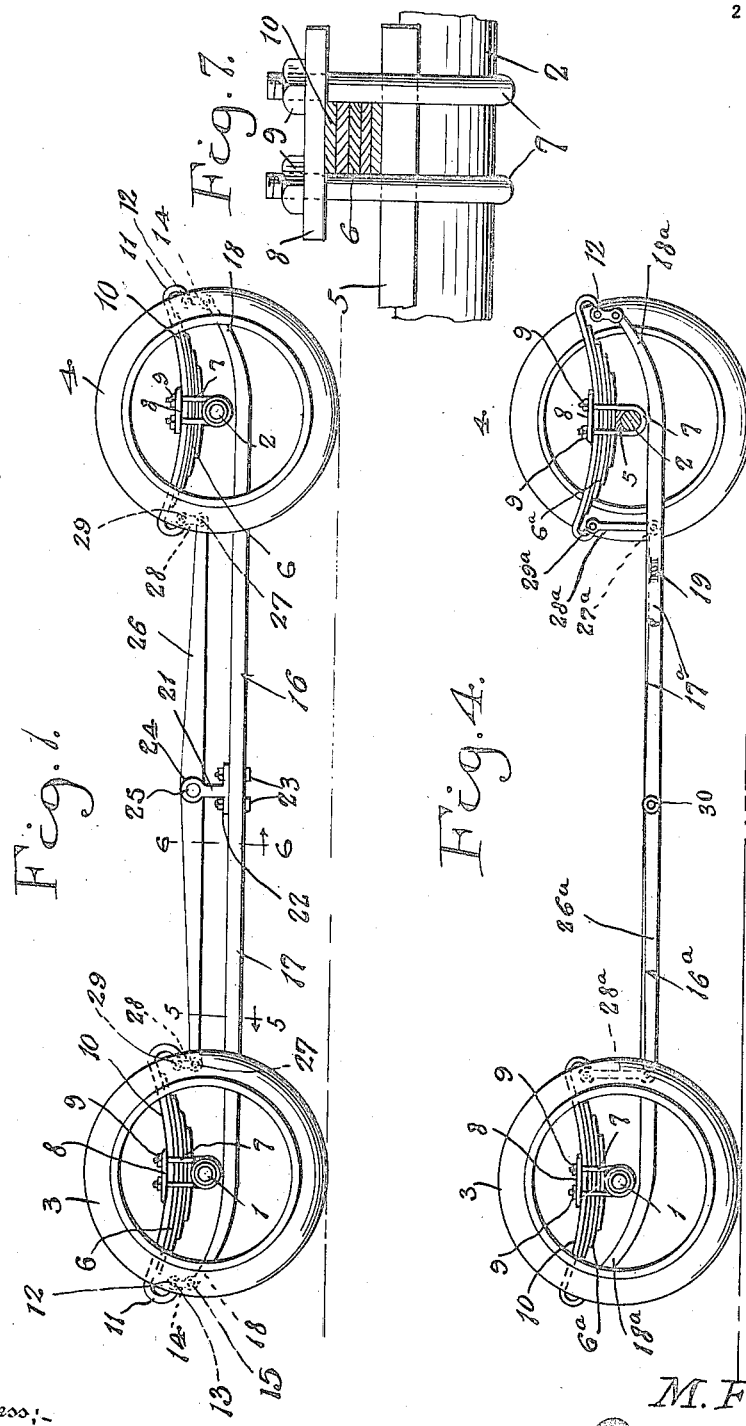

UNITED STATES PATENT OFFICE.

MATT F. ROSS, OF WINDFALL, INDIANA.

MOTOR-VEHICLE CONSTRUCTION.

1,253,729.   Specification of Letters Patent.   Patented Jan. 15, 1918.

Application filed November 17, 1916.   Serial No. 131,864.

*To all whom it may concern:*

Be it known that I, MATT F. ROSS, a citizen of the United States, residing at Windfall, in the county of Tipton and State of Indiana, have invented certain new and useful Improvements in Motor-Vehicle Constructions; and I do hereby declare the following to be a full, clear, and exact description of the invention, such as will enable others skilled in the art to which it appertains to make and use the same.

This invention relates to new and useful improvements in motor vehicle construction, and the principal object of the invention is to improve the chassis of a motor vehicle in order to enable the same to ride more easily, thus increasing the comfort of the occupants of the car.

Another object of the invention is to provide a novel form of spring suspension, which adds to the resiliency of the springs and increases the riding qualities of the vehicle.

A further object of the invention is to provide an under-slung chassis having an equalizing bar by which the power of the springs is readily distributed throughout the entire frame, thus assuring the equal distribution of strain when the vehicle is traveling over rough roads.

With these and other objects in view, the invention consists in the novel combination and arrangement of parts as will be fully set forth in the following specification and accompanying drawings, in which Figure 1 is a side view in elevation of a chassis constructed in accordance with this invention, Fig. 2 is a top plan view of Fig. 1, Fig. 3 is a top plan view of a modified form of chassis, showing the equalizing bars pivoted beside the side bars of the chassis, Fig. 4 is a side view partly in section of Fig. 3, Fig. 5 is a transverse sectional view on the line 5—5 of Fig. 1, Fig. 6 is a transverse sectional view on the line 6—6 of Fig. 1, and Fig. 7 is a fragmentary sectional view through one of the springs showing the axle connected thereto.

Referring to the drawings, the numeral 1 designates the forward or front axle of the vehicle, while the numeral 2 designates the rear axle. The front axle 1 has rotatably mounted at its outer ends the front wheels 3, while the rear axle is provided with the rear wheels 4. Supported near the outer ends of the front axle are suitable blocks 5 which form seats for the springs 6, which springs are held thereto by the U-shaped bolts 7, the ends of the arms of which extend beyond said springs and through a clamp plate 8, which engages the upper leaf of each spring, and suitable nuts 9 are threaded on the ends of said arms to clamp the plate firmly against the upper leaf of the spring on which it is seated. It will be understood that this connection is used for each of the axles, thus providing a rigid supporting means by which the springs are attached to the axles. The top leaf, designated by the numeral 10, of each spring is provided at opposite ends with down-turned hooks 11 formed with suitable eyes 12 for the reception of bolts 13, by means of which the hanger links 14 are secured to said spring. These hanger links 14 are attached on opposite sides of the eyes 12 and the lower ends of said links are apertured to receive the bolts 15, by means of which the ends of the main frame or chassis 16 are attached to said links.

As shown in the drawings, the chassis comprises the side bars 17, having their ends up-turned as at 18, which bars are held in spaced parallel relation by transversely extending bars 19 arranged intermediate their ends and a central frame structure 20.

Secured centrally of the side bars 17 of the chassis are suitable brackets 21 which are provided with flanges 22, having suitable apertures formed therein for the reception of bolts 23 by means of which they are attached to the side bars, and these brackets are provided at their upper ends with journal bearings 24 in which suitable pivots 25 are rotatably mounted. These pivots form supports for the equalizing bar 26, the opposite ends of which are provided with openings for the reception of rivets or bolts 27, by means of which the hanging links 28 are pivotally attached thereto. These links are provided at their upper ends with openings for the reception of rivets or bolts 29, which pass through eyes formed at the ends of the hook portions 11 of the spring leaf 10, which are disposed nearest the center of the frame.

In the modified form of the invention, the main frame or chassis is designated generally by the numeral 16ª, and the side bars 17ª are provided with up-turned ends 18ª to which the outer ends of the springs 6ª are connected. The inner ends of the springs 6ª are connected to the ends of the equalizing bar 26ª by means of suitable pivoted links 28ª, while the central portions of said equalizing bars are pivotally connected as at 30 to the outside of the frame bars 17ª, as will be clearly seen upon reference to the drawings.

It will be apparent from the foregoing that in use when the front wheel strikes an object in the roadway and the axle moves upwardly away from the side bars of the chassis, the strain will be transmitted to the spring, the forward end of which will tend to lift the forward end of the chassis, while the rear ends of said spring will tend to pull up on the forward ends of the equalizing bars, thereby causing the same to rock on their pivots so that the rear ends tend to move downwardly against the action of the springs at the rear end of the vehicle. In this way it will be seen that the equalizing bars will distribute the strain over the entire frame and in this manner make a much easier riding structure, which will materially increase the pleasure of riding over rough roads.

While in the foregoing there has been shown and described the preferred embodiment of this invention, it is to be understood that such changes may be made in the combination and arrangement of parts as will fall within the spirit and scope of the invention as claimed.

What is claimed is:

A chassis having a pair of spaced side bars having upwardly curved ends, springs having downturned ends pivotally secured to the upturned ends of said side bars, axles attached to the springs intermediate their ends, and bars pivoted to the upper face of the side bars of the chassis centrally thereof and having their opposite ends pivotally connected to the other ends of the springs.

In testimony whereof I affix my signature in presence of two witnesses.

MATT F. ROSS.

Witnesses:
 WALT CARTER,
 H. C. HASKETT.